US011890581B2

(12) United States Patent
Watanabe et al.

(10) Patent No.: US 11,890,581 B2
(45) Date of Patent: Feb. 6, 2024

(54) MEMBRANE DEFECT INSPECTION METHOD AND MEMBRANE DEFECT INSPECTION DEVICE

(71) Applicant: KUBOTA CORPORATION, Osaka (JP)

(72) Inventors: Keishi Watanabe, Amagasaki (JP); Shintaro Nishimoto, Amagasaki (JP); Tetsuya Uenaka, Amagasaki (JP); Fang Zhao, Amagasaki (JP); Akira Matsunaga, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 413 days.

(21) Appl. No.: 17/296,069

(22) PCT Filed: Dec. 3, 2019

(86) PCT No.: PCT/JP2019/047120
§ 371 (c)(1),
(2) Date: May 21, 2021

(87) PCT Pub. No.: WO2020/121881
PCT Pub. Date: Jun. 18, 2020

(65) Prior Publication Data

US 2021/0394123 A1 Dec. 23, 2021

(30) Foreign Application Priority Data

Dec. 12, 2018 (JP) ................................ 2018-232096

(51) Int. Cl.
*B01D 65/10* (2006.01)
*C02F 1/44* (2023.01)
(Continued)

(52) U.S. Cl.
CPC .............. *B01D 65/104* (2013.01); *C02F 1/44* (2013.01); *G01N 29/07* (2013.01); *G06T 7/0004* (2013.01);
(Continued)

(58) Field of Classification Search
CPC .................................................... B01D 65/104
See application file for complete search history.

(56) References Cited

U.S. PATENT DOCUMENTS

2005/0109695 A1* 5/2005 Olivier .................. B01F 25/211
210/150
2009/0299651 A1* 12/2009 Sadar .................. B01D 65/104
702/185

FOREIGN PATENT DOCUMENTS

CN 2018-32565 U 5/2011
CN 104568333 A 4/2015
(Continued)

OTHER PUBLICATIONS

Oct. 10, 2022 Office Action issued in Chinese Patent Application No. 201980071405.5.
(Continued)

*Primary Examiner* — Natalie Huls
*Assistant Examiner* — Cynthia L Davis
(74) *Attorney, Agent, or Firm* — Oliff PLC

(57) ABSTRACT

A membrane defect inspection method is for a membrane module set including a plurality of membrane modules connected in parallel under a straight pipe portion of gas detection piping extending in a horizontal direction and communicating with primary spaces in the plurality of membrane modules to which raw water is supplied or secondary spaces. The method includes a gas injection process where gas is injected into spaces opposite to the primary spaces or the secondary spaces communicating with
(Continued)

the gas detection piping while the gas detection piping is filled with water, and an echo detection process where an ultrasonic sensor is brought into contact with an end portion of the straight pipe portion of the gas detection piping, and a reflected wave of an ultrasonic wave transmitted from the ultrasonic sensor is detected.

9 Claims, 5 Drawing Sheets

(51) Int. Cl.
*G01N 29/07* (2006.01)
*G06T 7/00* (2017.01)

(52) U.S. Cl.
CPC .. *G01N 2291/011* (2013.01); *G01N 2291/023* (2013.01); *G01N 2291/0289* (2013.01); *G01N 2291/044* (2013.01); *G01N 2291/101* (2013.01); *G06T 2207/10132* (2013.01); *G06T 2207/30108* (2013.01)

(56) References Cited

FOREIGN PATENT DOCUMENTS

| | | | | | |
|---|---|---|---|---|---|
| JP | H01-281116 | A | | 11/1989 | |
| JP | H09-075690 | A | | 3/1997 | |
| JP | H11-311596 | A | | 11/1999 | |
| JP | H11311596 | A | * | 11/1999 | |
| JP | 2001-269551 | A | | 10/2001 | |
| JP | 2007-155458 | A | | 6/2007 | |
| JP | 2007-240373 | A | | 9/2007 | |
| JP | 2013-154293 | A | | 8/2013 | |
| KR | 10-0950218 | B1 | | 3/2010 | |
| KR | 10-2013-0137809 | A | | 12/2013 | |
| WO | 99/16538 | A1 | | 4/1999 | |
| WO | WO-9916538 | A1 | * | 4/1999 | ......... B01D 46/0086 |

OTHER PUBLICATIONS

Apr. 7, 2023 Office Action issued in Chinese Patent Application No. 201980071405.5.

Jul. 8, 2022 Extended European Search Report issued in European Patent Application No. 19895442.2.

Jan. 7, 2020 Search Report issused in International Patent Application No. PCT/JP2019/047120.

* cited by examiner

MEMBRANE DEFECT INSPECTION METHOD AND MEMBRANE DEFECT INSPECTION DEVICE

FIELD OF THE INVENTION

The present invention relates to a membrane defect inspection method and a membrane defect inspection device for a membrane module set including a plurality of membrane modules connected in parallel under a straight pipe portion of gas detection piping extending in a horizontal direction and communicating with primary spaces to which raw water is supplied or secondary spaces to which treated water is extracted after the raw water is filtrated by membranes. The present invention also relates to a membrane defect inspection method for a membrane separation apparatus including a plurality of membrane module sets including the plurality of membrane modules connected in parallel to the gas detection piping.

DESCRIPTION OF THE RELATED ART

Patent document 1 proposes a damage detection method for a permeable membrane module in a water purifying apparatus. The apparatus includes a casing divided into a raw water chamber, a circulating water chamber communicating with the raw water chamber, and a treated water chamber, and many hollow fiber membranes configured to make the treated water chamber communicate with the circulating water chamber. The apparatus discharges treated water led from the circulating water chamber to the hollow fiber membranes and the treated water chamber. The method includes blowing pressurized gas to outsides of the hollow fiber membranes while only the treated water chamber contains the treated water and the raw water chamber and the circulating water chamber are empty, and detecting bubbles generated on a treated water chamber side so as to detect damage in the hollow fiber membranes.

Patent document 2 proposes a membrane damage detection apparatus for a water treatment filtration system. In the system, raw water is supplied to membrane modules, and treated water purified by the membrane modules is distributed. The apparatus includes a pressurized gas supply means configured to supply pressurized gas at a predetermined pressure to a primary side or a secondary side of the membrane modules, a vibration detection sensor attached to an upper portion of each of the membrane modules to detect vibration caused by a bubble flow leaking out from a damaged part in a membrane and rising in the water, and a vibration analysis processing device configured to individually select a vibration signal detected by each vibration sensor and analyze the vibration signal to detect membrane damage in the membrane modules.

Patent document 3 proposes a membrane damage detection method for a hollow fiber membrane. There is a flow channel where raw liquid is supplied from an outside or an inside of the hollow fiber membrane and filtrate water is extracted from the other side. In the flow channel, part of a pipe where the filtrate water flows or stagnates is made of a transparent pipe. The method includes supplying air to the flow channel, where the raw liquid is supplied from the outside or the inside of the hollow fiber membrane and the filtrate water is extracted from the other side, so as to detect membrane damage in the hollow fiber membrane by passage of bubbles of the air through the transparent pipe.

PRIOR ART DOCUMENT

Patent Documents

[Patent document 1] Japanese Unexamined Patent Application Publication No. 2001-269551

[Patent document 2] Japanese Unexamined Patent Application Publication No. 2007-240373

[Patent document 3] Japanese Unexamined Patent Application Publication No. 1999-311596

SUMMARY OF INVENTION

Problems to be Solved by the Invention

The damage detection method described in Patent document 1 requires using an ultrasonic flowmeter to detect the bubbles, which imposes an installation restriction that the ultrasonic flowmeter needs to be installed to a straight pipe having a predetermined length for establishing an appropriate detection environment, and thus the ultrasonic flowmeter cannot be installed to all types of water purifying apparatus. In addition, the method can only detect the bubbles and cannot individually identify a damaged hollow fiber membrane.

The membrane damage detection apparatus described in Patent document 2 has problems. The apparatus requires many vibration detection sensors since the vibration detection sensor is attached to each of the membrane modules. A firm structure of the membrane module having pressure resistance weakens vibration signals to be detected by the vibration detection sensor, and thus detection accuracy is degraded due to noise of external vibration or the like. In addition, similarly to the damage detection method described in Patent document 1, the apparatus cannot individually identify a damaged membrane module.

The membrane damage detection method described in Patent document 3 requires visual inspection of whether the bubbles of the air pass through the transparent pipe, and thus automatic detection is difficult.

In view of the problems described above, an object of the present invention is to provide a membrane defect inspection method and a membrane defect inspection device that can automate detection of damage or a seal defect in a filtrate membrane and can individually identify a membrane module having the damage or the seal defect.

Means for Solving the Problems

In order to achieve the object described above, a first characteristic configuration of a membrane defect inspection method for a membrane module set according to the present invention is that the method is for the membrane module set including a plurality of membrane modules connected in parallel under a straight pipe portion of gas detection piping extending in a horizontal direction and communicating with primary spaces in the plurality of membrane modules to which raw water is supplied or secondary spaces in the plurality of membrane modules to which treated water is extracted after the raw water is filtrated by membranes. The method includes a gas injection process where gas is injected into spaces opposite to the primary spaces or the secondary spaces communicating with the gas detection piping in the plurality of membrane modules while the gas detection piping is filled with water, and an echo detection process where an ultrasonic sensor including an ultrasonic transmitting section and an ultrasonic receiving section is brought into contact with an end portion of the straight pipe portion of the gas detection piping and a reflected wave of an ultrasonic wave transmitted from the ultrasonic transmitting section is detected by the ultrasonic receiving section.

When the gas injection process is performed, and the echo detection process is performed by transmitting the ultrasonic wave from the ultrasonic transmitting section brought into contact with the end portion of the gas detection piping filled with water and disposed in a horizontal manner while any of filtrate membranes accommodated in the membrane modules has a defect, the ultrasonic wave reflected at a portion where bubbles rise in the gas detection piping is detected by the ultrasonic receiving section. A distance from the end portion of the gas detection piping to the portion where the bubbles rise can be calculated based on a delay time from transmission of the ultrasonic wave to reception of the reflected wave.

A second characteristic configuration of the method is that, in addition to the first characteristic configuration described above, the method may further include a membrane module identification process where a membrane module having a defect part is identified from a result obtained in the echo detection process.

In the membrane module identification process, it is determined that damage or a seal defect occurs in a membrane module closest to the portion where the bubble rise, which is identified based on the calculated distance from the end portion of the gas detection piping.

A third characteristic configuration of the method is that, in addition to the first or second characteristic configuration described above, the gas detection piping may be made of resin.

When the piping with which the ultrasonic sensor is brought into contact is made of resin, the ultrasonic wave is propagated in the piping filled with water without being attenuated largely at the pipe end portion, and thus sufficient detection accuracy can be attained.

A fourth characteristic configuration of the method is that, in addition to any of the first to third characteristic configurations described above, the ultrasonic sensor may be brought into contact such that the ultrasonic wave is transmitted in an axial direction of the straight pipe portion of the gas detection piping in the echo detection process.

With propagation of the ultrasonic wave in the axial direction of the straight pipe portion, one-time measurement can surely detect from which of the membrane modules connected in parallel to the straight pipe portion the bubbles are leaking out. When there is no portion where the bubbles rise, the reflected wave cannot be detected or a reflection from an opposite pipe end portion is detected.

A first characteristic configuration of a membrane defect inspection method for a membrane separation apparatus according to the present invention is that the method is for the membrane separation apparatus including a plurality of membrane module sets including the plurality of membrane modules connected in parallel under the gas detection piping. The method includes the gas injection process to be performed while the water is filled in gas detection large piping communicating with the gas detection piping and collecting gas emitted to the gas detection piping in the whole membrane separation apparatus, and a gas accumulation detection process where an accumulation of the gas in a transparent portion of the gas detection large piping is detected. When the accumulation of the gas is detected in the gas accumulation detection process, the membrane defect inspection method for the membrane module set including any of the first to fourth characteristic configurations described above is performed.

When the accumulation of the gas is detected in the membrane separation apparatus including the plurality of membrane module sets, it can be determined that any of the membrane modules has damage or a seal defect. Then, performing the membrane defect inspection method for the membrane module set allows efficient detection of the damage or the seal defect in a filtrate membrane.

A second characteristic feature of the method is that, in addition to the first characteristic configuration described above, at least part of the gas detection large piping may be transparent, and a gas-liquid interface observed at the transparent portion of the gas detection large piping may be detected by an image analysis to detect the accumulation of the gas in the gas accumulation detection process.

When at least part of the gas detection large piping is transparent, a state of this part can be visually confirmed and the accumulation of the gas can be visually detected. In addition, the accumulation of the gas can be automatically determined by taking an image of the transparent portion of the gas detection large piping and performing the image analysis of the image.

A characteristic configuration of a membrane defect inspection device for the membrane module set according to the present invention is that the device is configured to implement the membrane defect inspection method including any of the first to fourth characteristic configurations described above. The device includes the membrane module set including the plurality of membrane modules connected in parallel under the straight pipe portion of the gas detection piping extending in the horizontal direction and communicating with the primary spaces in the plurality of membrane modules to which the raw water is supplied or the secondary spaces in the plurality of membrane modules to which the treated water is extracted after the raw water is filtrated by the membranes, the ultrasonic sensor including the ultrasonic transmitting section and the ultrasonic receiving section and attached to the end portion of the straight pipe portion of the gas detection piping, and a signal processing section configured to identify the membrane module having a defect based on the delay time from a transmission time of the ultrasonic wave to a detection time of the reflected wave after the ultrasonic receiving section detects the reflected wave of the ultrasonic wave transmitted from the ultrasonic transmitting section in the axial direction of the gas detection piping.

Effects of Invention

As described above, the present invention can provide a membrane defect inspection method and a membrane defect inspection device that can automate detection of damage or a seal defect in a filtrate membrane and can individually identify a membrane module having the damage or the seal defect.

DESCRIPTION OF THE PREFERRED EMBODIMENTS

A membrane defect inspection method and a membrane defect inspection device according to the present invention are described below.

[Configurations of Membrane Module Set and Membrane Separation Apparatus]

Figure 1A:
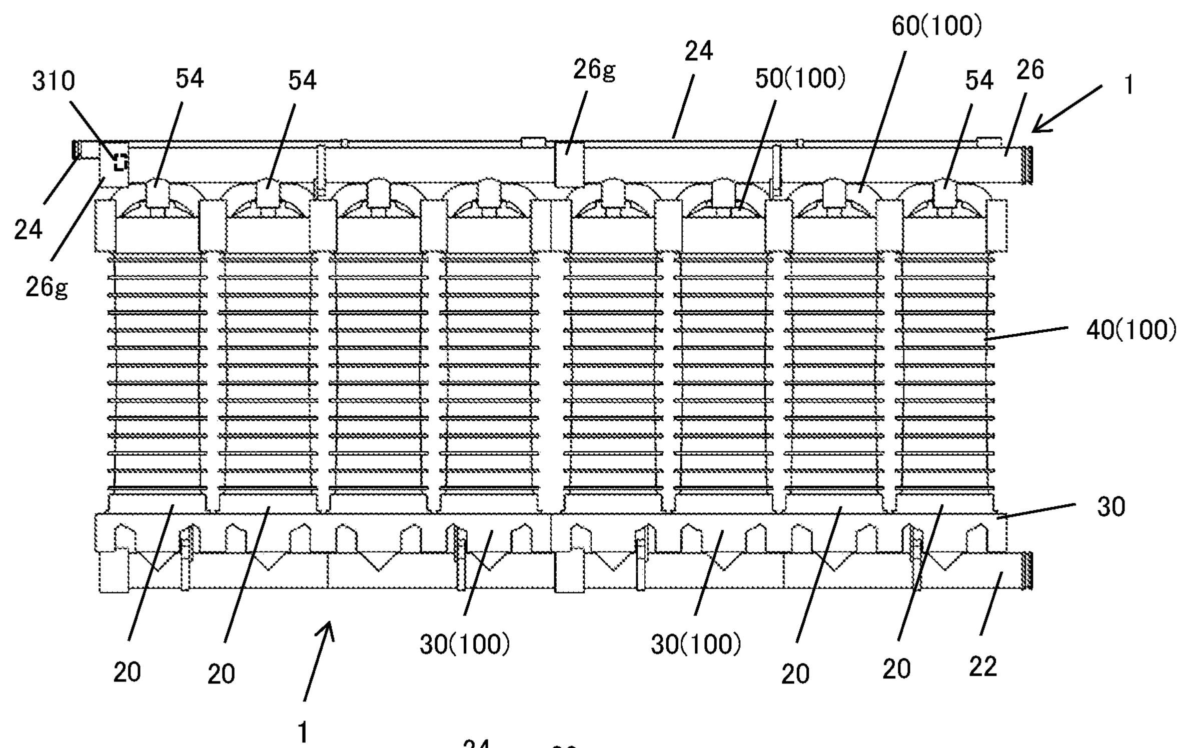
FIG. 1A is a front view of a membrane module set.
Figure 1B:
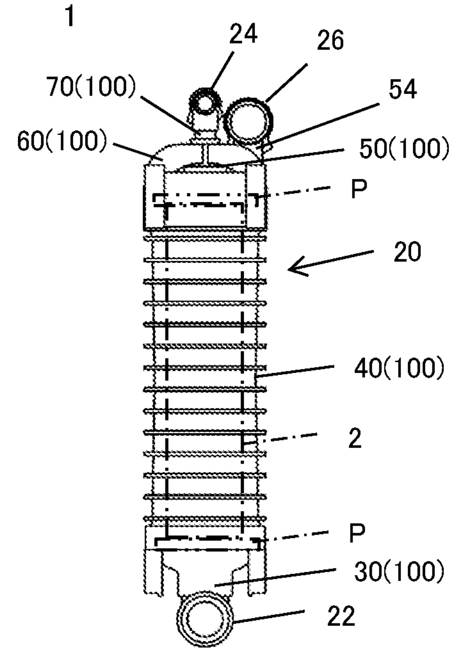
FIG. 1B is a left side view of the membrane module set.

FIG. 1A and FIG. 1B illustrate a membrane module set 1 to which the membrane defect inspection method according to the present invention is applied. The membrane module set 1 includes eight membrane modules 20, a raw water header pipe 22 serving as raw water supply piping configured to supply raw water to each membrane module 20, a cleaning header pipe 24 serving as cleaning air piping configured to supply air, water, or chemical liquid for cleaning to each membrane module 20, and a filtrate water header pipe 26 serving as treated water piping configured to collect filtrate water from each membrane module 20.

Each membrane module 20 includes a membrane casing 100 and a membrane element 2 (indicated by a dashed line in FIG. 1B) accommodated in the membrane casing 100. The membrane casing 100 includes a base 30, a casing body 40, an upper lid 50, a support section 60 supported by the casing body 40, a holding section 70 holding the support section 60 and the upper lid 50 such that relative positions of the support section 60 and the upper lid 50 are adjustable along an axial direction of the casing body 40, or the like.

The membrane element 2 is accommodated in the casing body 40 with its top and bottom pressed via seal members P between the base 30 and the upper lid 50.

The raw water supplied from the raw water header pipe 22 is filtrated by the membrane element 2, and the filtrate water flows through a gap between an inner wall of the casing body 40 and the membrane element 2 to a filtrate water outflow pipe 54 formed to the upper lid 50 to be collected into the filtrate water header pipe 26.

When the membrane element 2 is clogged up or soiled, cleaning water is supplied from the filtrate water header pipe 26 to clean the membrane element 2, and the cleaning water is discharged from the raw water header pipe 22. Then, cleaning air or the like is supplied from the cleaning header pipe 24 for flushing. As for the base 30, casing body 40, upper lid 50, support section 60, holding section 70, or the like, any material such as metal or resin may be used as long as it can endure pressure during a filtration process or a cleaning process. As for the piping such as the filtrate water header pipe 26, resin is used, such as an ABS resin or a polyvinyl chloride resin suitable for workability and inspection of membrane damage or a seal defect described later.

As for the membrane element 2, any filtrate membrane may be used, such as a microfiltration membrane, an ultrafiltration membrane, or a nanofiltration membrane, if it blocks particles or macromolecules in a predetermined size in accordance with a use. The filtrate membrane may include an organic membrane such as a hollow fiber membrane made of cellulose acetate or polyimide, or a porous inorganic membrane made of a ceramic material.

When the raw water is injected from the raw water header pipe 22, a filtration process makes progress to remove foreign substances by a filtration membrane layer on an inner wall of a fluid flow hole formed in the membrane element 2, and the filtrate water flowing out from a surface of the membrane element 2 is led to the filtrate water outflow pipe 54 through a space formed between a circumferential surface of the membrane element 2 and an inner wall surface of the casing body 40 to be collected into the filtrate water header pipe 26.

The plurality of membrane modules 20, namely, eight membrane modules 20 in the present embodiment, are connected in parallel under a straight pipe portion of the filtrate water header pipe 26 serving as the treated water piping extending in the horizontal direction, so as to constitute the membrane module set 1.

Figure 2A:
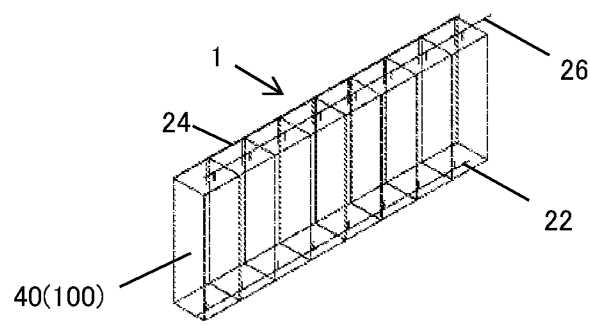
FIG. 2A is a schematic view of the membrane module set and FIG. 2B is a schematic view of a membrane separation apparatus including a plurality of membrane module sets.
Figure 2B:
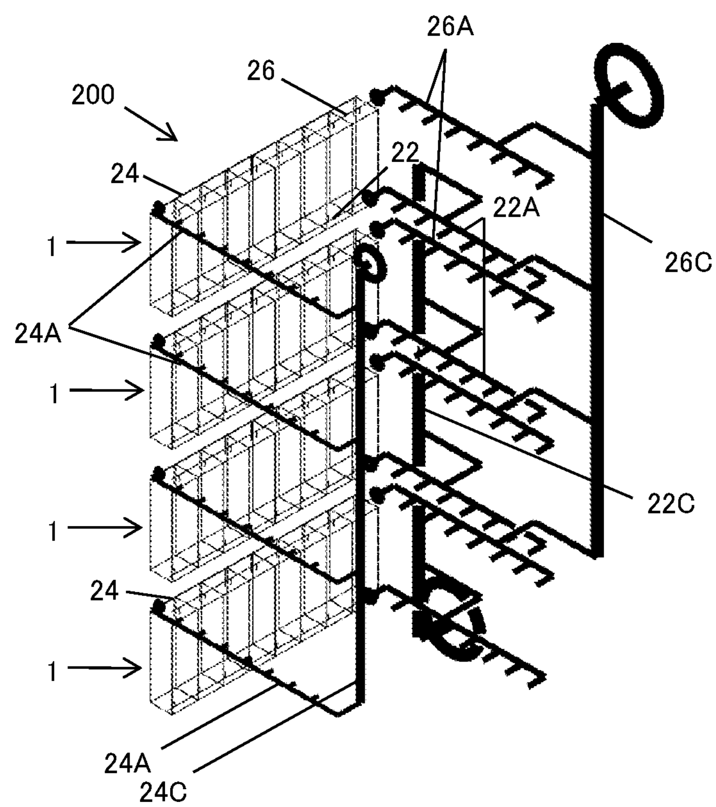

FIG. 2A is a simplified schematic view of the membrane module set 1 described above, and FIG. 2B is a schematic view of a membrane separation apparatus 200 including a plurality of membrane module sets 1 including the plurality of membrane modules 20 connected in parallel to the filtrate water header pipe 26.

A frame having a vertically long rectangular parallelepiped contour has four shelves in a vertical direction, and each shelf includes eight membrane module sets 1. The raw water header pipe 22, cleaning header pipe 24, and filtrate water header pipe 26 in each membrane module set 1 are respectively connected to raw water large piping 22C, cleaning large piping 24C, and filtrate water large piping 26C serving as treated water large piping via relay piping 22A, 24A, and 26A.

[Membrane Defect Inspection Method and Membrane Defect Inspection Device]

When any of the membrane modules 20 included in the plurality of membrane module sets 1 constituting the membrane separation apparatus 200 has membrane damage or a seal defect, turbidity is mixed in the treated water, which disables appropriate filtration processing.

Even in such a case, with the membrane defect inspection method according to the present invention, the membrane module 20 having the membrane damage or the seal defect can be individually identified, and the membrane module 20 in an abnormal state can be replaced immediately.

Figure 3A:
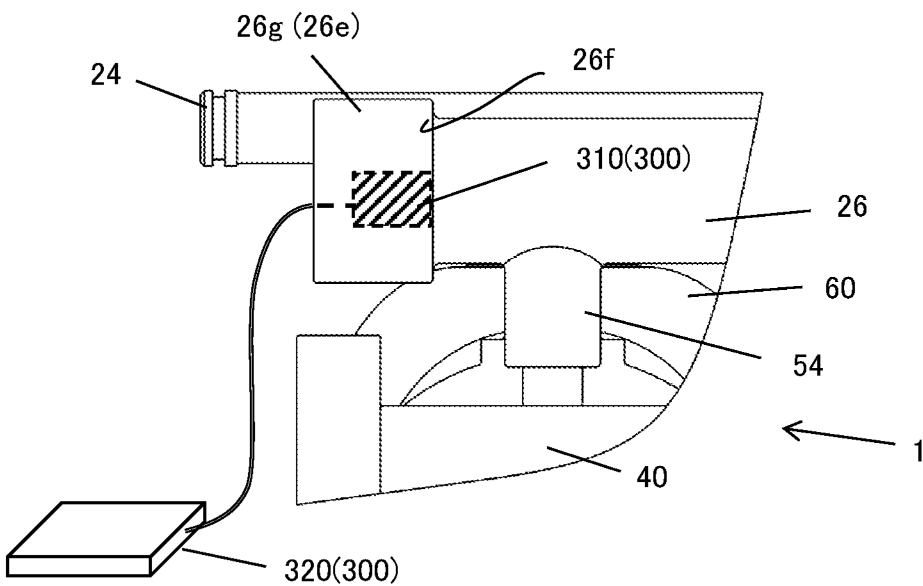
FIG. 3A illustrates a membrane defect inspection method for the membrane module set, and is a front view of a major part of a sensor installation part.

As shown in FIG. 3A, the filtrate water header pipe 26 in each membrane module set 1 has a flange **26*g* for pipe connection, and the flange 26*g* is formed at a pipe end portion 26*e* opposite to a side connected to the filtrate water large piping 26C so as to extend from a pipe end face 26*f* to have a slightly larger diameter. The filtrate water header pipe 26 functions as gas detection piping and the filtrate water large piping 26**C functions as gas detection large piping.

Figure 3B:
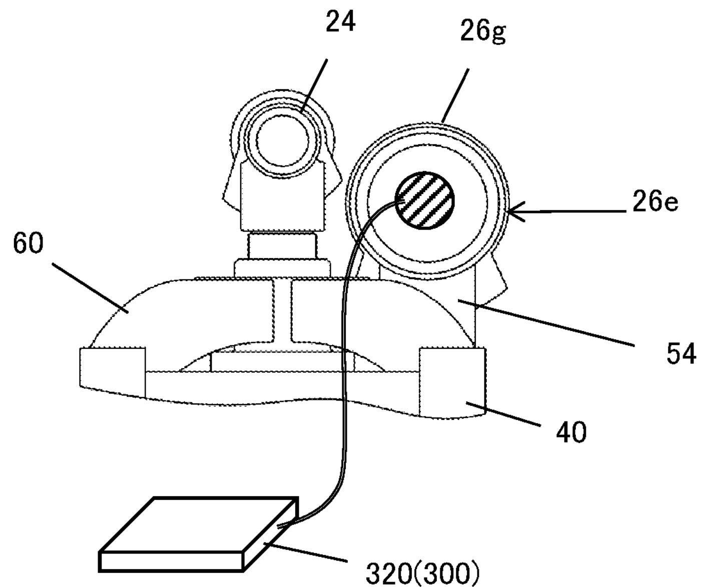
FIG. 3B is a side view of the major part of the sensor installation part.

FIG. 3B shows a membrane defect inspection device 300 attached to the membrane module set 1. The membrane defect inspection device 300 includes an ultrasonic sensor 310 and a signal processing section 320. The ultrasonic sensor 310 includes an ultrasonic transmitting section and an ultrasonic receiving section and is disposed to be in contact with a center of an end face of the pipe end portion **26*e***.

The ultrasonic sensor 310 is brought into contact with the pipe end face 26*f* of the filtrate water header pipe 26 communicating with secondary spaces in the membrane modules 20 to which the treated water is extracted after filtration by the filtrate membranes, while the filtrate water header pipe 26 is filled with water and air is injected into the membrane elements 2 from the raw water header pipe 22 communicating with primary spaces in the membrane modules 20 to which the raw water is supplied.

Then, an ultrasonic wave is transmitted from the ultrasonic transmitting section along an axial direction of the filtrate water header pipe 26, and a reflected wave of the ultrasonic wave is detected by the ultrasonic receiving section. The signal processing section 320 determines whether any of the membrane modules 20 connected to the filtrate water header pipe 26 has a defect based on a delay time from a transmission time of the ultrasonic wave to a detection time of the reflected wave. When any of the membrane modules 20 has a defect, air leaks out from a defect part and bubbles flow into the filtrate water header pipe 26 via the filtrate water outflow pipe 54, and the ultrasonic wave reflected by the bubbles is detected by the ultrasonic receiving section.

Figure 3C:
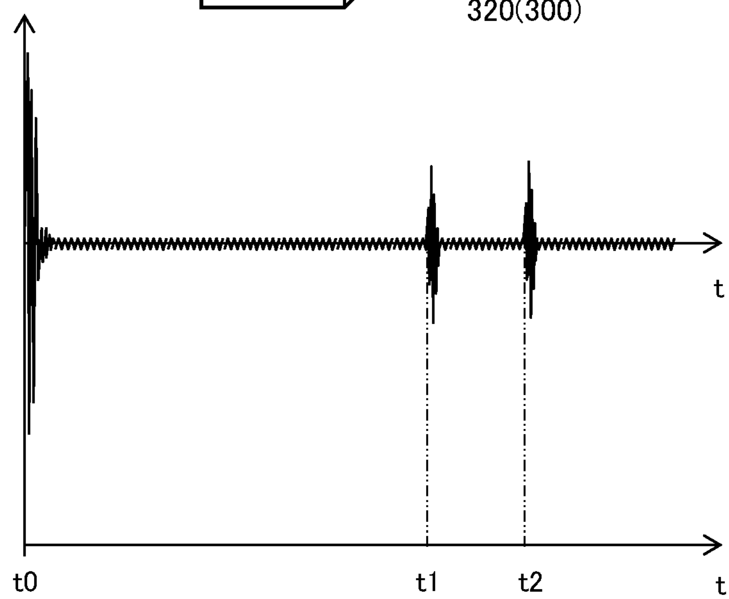
FIG. 3C is a graph illustrating a signal during inspection.

FIG. 3C shows a waveform when the reflected wave of the ultrasonic wave transmitted from the ultrasonic transmitting section at a time t0 is detected by the ultrasonic receiving section at a time t1 and a time t2. The reflected wave detected at the time t2 is a reflection from a pipe wall of the filtrate water relay pipe 26A connected with the filtrate water header pipe 26.

When all the membrane modules 20 connected to the filtrate water header pipe 26 are normal, only the reflected wave at the time t2 is detected. However, when any of the membrane modules 20 is abnormal, the reflected wave reflected by the bubbles leaking out from this membrane module 20 is detected at the time t1. The signal processing section 320 determines that the membrane module 20 connected closest to a position corresponding to the time t1 in the axial direction of the filtrate water header pipe 26 is abnormal (the position is calculated by a formula $(v \times t1)/2$ where v represents propagation velocity of the ultrasonic wave).

Figure 4:
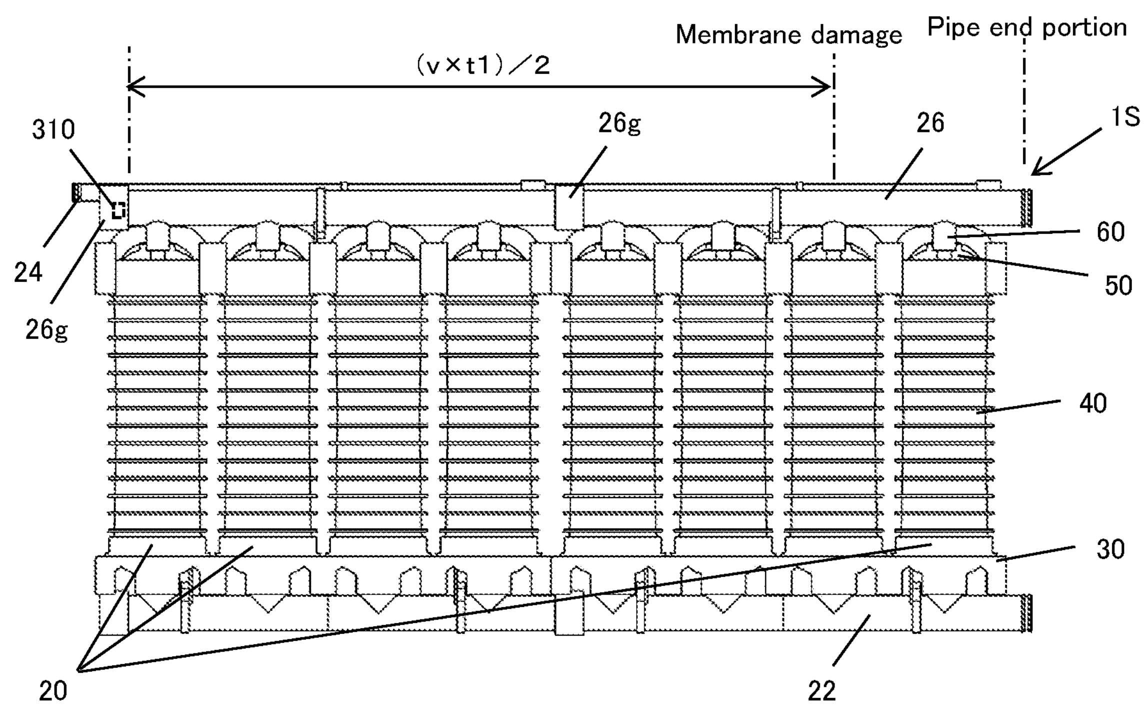
FIG. 4 is an explanatory view of the membrane module set, illustrating a position of a membrane module having membrane damage or a seal defect.

In an example shown in FIG. 4, it is calculated that the position corresponding to the time t1 in the axial direction of the filtrate water header pipe 26 is around a seventh membrane module 20 counted from an installation position of the ultrasonic sensor 310 in the membrane modules 20 constituting the membrane module set 1, and thus it is determined that leakage occurs at the seventh membrane module 20.

As described above, the filtrate water header pipe 26 serving as the treated water piping is preferably made of resin having excellent ultrasonic transmission characteristics. Accordingly, the filtrate water header pipe 26 includes a pipe member made of resin such as an ABS resin or a polyvinyl chloride resin. When the piping with which the ultrasonic sensor 310 is brought into contact is made of resin, the ultrasonic wave is propagated in the piping filled with water without being attenuated largely at the pipe end portion, and thus sufficient detection accuracy can be attained.

In an echo detection process, a contact direction of the ultrasonic sensor is preferably adjusted to transmit the ultrasonic wave in the axial direction of the straight pipe portion of the filtrate water header pipe 26. With propagation of the ultrasonic wave in the axial direction of the straight pipe portion, it can be securely detected from which of the membrane modules 20 connected in parallel to the straight pipe portion the bubbles are leaking out.

The membrane defect inspection device 300 described above is included in each of the membrane module sets 1 constituting the membrane separation apparatus 200, and the signal processing section 320 is remotely controlled, so that presence or absence of abnormality can be automatically detected whenever necessary.

However, when the membrane defect inspection device 300 is included in each of the membrane module sets 1, economic efficiency may be degraded. In view of this, a membrane defect inspection method for the membrane separation apparatus 200 described below may be performed, and when abnormality is detected in any of the membrane module sets 1, the membrane defect inspection method for each membrane module set 1 may be manually performed, so as to improve the economic efficiency.

That is, the membrane defect inspection method for the membrane separation apparatus 200 requires that the treated water large piping 26C to which the treated water obtained in the whole membrane separation apparatus 200 is extracted is at least partly transparent. The method includes a gas injection process where gas is injected from a raw water supply side of the membrane separation apparatus 200, namely, the raw water large piping 22C, while the treated water large piping 26C is filled with water, and a gas accumulation detection process where a gas accumulation in a transparent portion of the treated water large piping 26C is detected. When the gas accumulation is detected in the gas accumulation detection process, the membrane defect inspection method for the membrane module set 1 described above is performed.

Figure 5A:
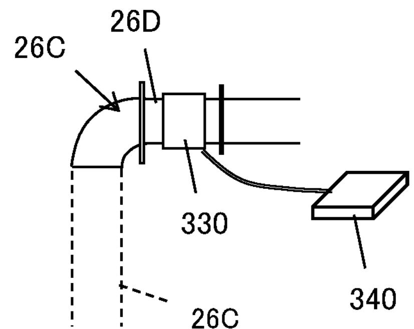
FIG. 5A illustrates the defect inspection method for the membrane separation apparatus, and is an explanatory view of an inspection device attached to filtrate water large piping in the membrane separation apparatus.
Figure 5B:
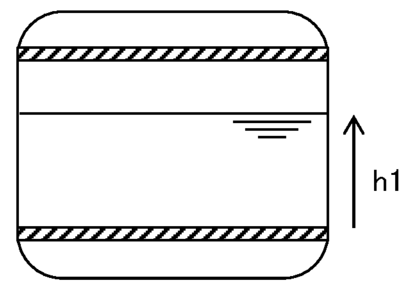
FIG. 5B illustrates the defect inspection method for the membrane separation apparatus, and is an explanatory view of an inspection image in a normal state.
Figure 5C:
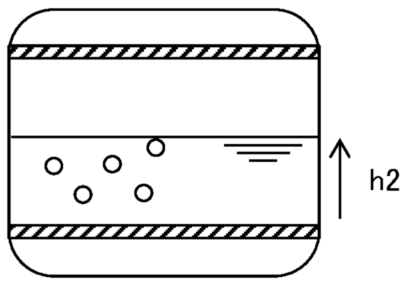
FIG. 5C illustrates the defect inspection method for the membrane separation apparatus, and is an explanatory view of an inspection image in an abnormal state.

As shown in FIG. 5A, it is preferable that part of horizontal piping flange-connected with a bent pipe at an upper end portion of the treated water large piping 26C be formed of a transparent resin pipe 26D, and an imaging device 330 be disposed to take an image of an inside of the pipe through the transparent resin pipe 26D in a horizontal manner.

When any of the membrane modules 20 has membrane damage or a seal defect, leaking bubbles flow into the transparent resin pipe 26D and rise so as to shift a water surface downward. An image processing device 340 analyzes the image including a gas-liquid interface taken by the imaging device 330, so that when a decline of the water surface is detected, it can be determined that any of the membrane modules 20 is out of order.

A computer device with image analysis software installed can be suitably used as the image processing device 340, and the gas-liquid interface can be extracted by performing edge extraction processing to the taken image, for example. The analysis may be performed by the image processing device 340 remotely installed by wirelessly transmitting the image taken by the imaging device 330.

Alternatively, a shift of the gas-liquid interface may be observed by direct visual checking of the transparent resin pipe 26D without using the imaging device 330 and the image processing device 340.

In the membrane module set 1 according to the above-described embodiment, the filtrate water header pipe 26 is disposed above the membrane modules 20 and the filtrate water header pipe 26 is used as the gas detection piping. However, in a membrane module set 1 including the raw water header pipe 22 disposed above the membrane modules 20, gas may be injected into the secondary spaces in the membrane modules 20 to use the raw water header pipe 22 as the gas detection piping and the raw water large piping 22C as the gas detection large piping. In this case, the gas may be injected from a filtrate water extraction side of the membrane modules 20, the ultrasonic sensor may be disposed in contact with an end portion of the raw water supply piping.

Furthermore, in the membrane module set 1 according to the above-described embodiment, the cleaning air piping may be used as the gas detection piping and the cleaning large piping 24C may be used as the gas detection large piping, or the gas detection piping and the gas detection large piping exclusively used for membrane defect inspection may be separately disposed.

That is, the membrane defect inspection method for the membrane module set 1 according to the present invention is the method for the membrane module set 1 including the plurality of membrane modules 20 connected in parallel under the straight pipe portion of the gas detection piping extending in the horizontal direction and communicating with the primary spaces in the plurality of membrane modules 20 to which the raw water is supplied or the secondary spaces in the plurality of membrane modules 20 to which the treated water is extracted after the raw water is filtrated by the membranes. The method includes the gas injection process where the gas is injected into spaces opposite to the primary spaces or the secondary spaces communicating with the gas detection piping in the plurality of membrane modules 20 while the gas detection piping is filled with water, and the echo detection process where the ultrasonic sensor including the ultrasonic transmitting section and the ultrasonic receiving section is brought into contact with the end portion of the straight pipe portion of the gas detection piping, and the reflected wave of the ultrasonic wave transmitted from the ultrasonic transmitting section is detected by the ultrasonic receiving section.

Basic configurations of the membrane defect inspection method and the membrane defect inspection device according to the present invention have been described above with reference to the drawings, however, specific inspection procedures and device configurations of the membrane defect inspection method and the membrane defect inspection device are not limited to the mode described in the above-described embodiment, and may be selected and implemented as appropriate as long as the operations and effects of the present invention are obtained.

REFERENCE SIGNS LIST

1 Membrane Module Set
2 Membrane Element
20 Membrane Module
22 Raw Water Header Pipe (Raw Water Supply Piping)
24 Cleaning Header Pipe (Cleaning Air Piping)
26 (Treated Water Piping) Filtrate Water Header Pipe
26C (Treated Water Large Piping) Filtrate Water Large Piping
40 Casing (Body)
50 Casing (Upper Lid)
54 Filtrate Water Outflow Pipe
60 Support Section

The invention claimed is:

1. A membrane defect inspection method for a membrane module set comprising a plurality of membrane modules connected in parallel under a straight pipe portion of gas detection piping extending in a first direction, all of the membrane modules being continuously arranged under the straight pipe portion at intervals along the first direction, and the straight pipe portion communicating with primary spaces in each of the plurality of membrane modules to which raw water is supplied or secondary spaces in each of the plurality of membrane modules from which treated water is extracted after the raw water is filtrated by membranes, the method comprising:

a gas injection process where gas is injected into spaces opposite to the primary spaces or the secondary spaces communicating with the gas detection piping in the plurality of membrane modules while the gas detection piping is filled with water; and an echo detection process where an ultrasonic sensor comprising an ultrasonic transmitting section and an ultrasonic receiving section is brought into contact with an end portion of the straight pipe portion of the gas detection piping extending in the first direction, and a reflected wave of an ultrasonic wave transmitted from the ultrasonic transmitting section along a longitudinal axis of the straight pipe portion parallel to the first direction, is detected by the ultrasonic receiving section.

2. A membrane defect inspection method for a membrane separation apparatus comprising a plurality of membrane module sets comprising the plurality of membrane modules connected in parallel under the gas detection piping, the method comprising:

the gas injection process being performed while the water is filled in gas detection large piping communicating with the gas detection piping and collecting the gas emitted to the gas detection piping in the whole membrane separation apparatus; and a gas accumulation detection process where an accumulation of the gas in a transparent portion of the gas detection large piping is detected, wherein the membrane defect inspection method for the membrane module set according to claim 1 is performed when the accumulation of the gas is detected in the gas accumulation detection process.

3. The membrane defect inspection method for the membrane separation apparatus according to claim 2, wherein at least part of the gas detection large piping is transparent, and wherein a gas-liquid interface observed at the transparent portion of the gas detection large piping is detected by an image analysis to detect the accumulation of the gas in the gas accumulation detection process.

4. The membrane defect inspection method for the membrane module set according to claim 1, the method further comprising a membrane module identification process where a membrane module having a defective part is identified from a result obtained in the echo detection process.

5. A membrane defect inspection method for a membrane separation apparatus comprising a plurality of membrane module sets comprising the plurality of membrane modules connected in parallel under the gas detection piping, the method comprising:

the gas injection process being performed while the water is filled in gas detection large piping communicating with the gas detection piping and collecting the gas emitted to the gas detection piping in the whole membrane separation apparatus; and a gas accumulation detection process where an accumulation of the gas in a transparent portion of the gas detection large piping is detected, wherein the membrane defect inspection method for the membrane module set according to claim 4 is performed when the accumulation of the gas is detected in the gas accumulation detection process.

6. The membrane defect inspection method for the membrane separation apparatus according to claim 5, wherein at least part of the gas detection large piping is transparent, and wherein a gas-liquid interface observed at the transparent portion of the gas detection large piping is detected by an image analysis to detect the accumulation of the gas in the gas accumulation detection process.

7. The membrane defect inspection method for the membrane module set according to claim 1, wherein the gas detection piping is made of resin.

8. The membrane defect inspection method for the membrane module set according to claim 4, wherein the gas detection piping is made of resin.

9. A membrane defect inspection device for the membrane module set, the device being configured to implement the membrane defect inspection method according to claim 1, the device comprising:

the membrane module set;

the ultrasonic sensor; and a signal processing section configured to identify a membrane module having a defect based on a delay time from a transmission time of the ultrasonic wave to a detection time of the reflected wave in the echo detection process.

* * * * *